United States Patent [19]

Shibuya et al.

[11] Patent Number: 5,477,509
[45] Date of Patent: Dec. 19, 1995

[54] MAGNETO-OPTICAL HEAD CIRCUIT FOR MINIMIZING THE OVERSHOOT REVERSING CURRENT

[75] Inventors: Giichi Shibuya; Masanori Shibahara; Takashi Onodera, all of Nagano, Japan

[73] Assignee: TDK Corporation, Tokyo, Japan

[21] Appl. No.: 325,165

[22] Filed: Oct. 21, 1994

[30] Foreign Application Priority Data

Oct. 26, 1993 [JP] Japan .................................. 5-289870

[51] Int. Cl.$^6$ .................................................. G11B 13/04
[52] U.S. Cl. ............................ 369/13; 360/114; 360/46
[58] Field of Search ..................... 369/13, 14; 360/114, 360/46, 59; 365/122

[56] References Cited

U.S. PATENT DOCUMENTS

| | | | |
|---|---|---|---|
| 4,937,802 | 6/1990 | Omori et al. | 369/13 |
| 5,329,408 | 7/1994 | Fuji | 360/46 |
| 5,331,477 | 7/1994 | Sugiyama | 360/46 |
| 5,359,466 | 10/1994 | Fuji et al. | 360/46 |
| 5,377,055 | 12/1994 | Ishii | 360/46 |

FOREIGN PATENT DOCUMENTS

| | | |
|---|---|---|
| 63-94406 | 4/1988 | Japan . |
| 64-296534 | 7/1991 | Japan . |
| 4-42242 | 2/1993 | Japan . |

Primary Examiner—Georgia Y. Epps
Assistant Examiner—Tan Dinh
Attorney, Agent, or Firm—Watson, Cole, Grindle & Watson

[57] ABSTRACT

An apparatus for generating a modulated magnetic field includes a magnetic head coil and a pair of additional inductive coils. The ratio of the average inductance of the additional inductive coils to the inductance of the head coil is from 2 to 8. The apparatus ensures a magneto-optical recording system of the magnetic field modulation mode having an increased switching speed and a minimized overshoot of recording current.

9 Claims, 5 Drawing Sheets

TIME →

TIME →

TIME

TIME

5,477,509

MAGNETO-OPTICAL HEAD CIRCUIT FOR MINIMIZING THE OVERSHOOT REVERSING CURRENT

BACKGROUND OF THE INVENTION

1. Field of the Invention

This invention relates to a magneto-optical recording system of the magnetic field modulation mode and a modulated magnetic field generating apparatus used therein.

2. Optical Art

Optical disks are of great interest as high capacity information carrying media. Among the optical disks, magneto-optical disks of the magnetic field modulation mode are expected to find use in data files and other advanced applications. The magnetic field modulation mode is to record signals in a magneto-optical disk by directing a laser beam from an optical head to the recording layer in a DC manner for raising the temperature of the irradiated spot, and applying a modulated magnetic field across the recording layer from a magnetic head opposed to the optical head at the same time. Therefore, the magnetic field modulation mode allows for overwrite recording and has potential application to rewritable compact disks.

The magnetic heads used in the magnetic field modulation mode are classified into flying magnetic heads which are kept afloat on the disk surface by aerodynamic buoyancy due to disk rotation like the magnetic heads of rigid disk drives and non-flying magnetic heads which are positioned at a fixed distance from the disk surface independent of disk rotation. The non-flying magnetic heads include a stationary head which is fixedly secured at a fixed distance from the disk surface and a sliding head which is received in a slider such that the head is backwardly remote from the disk sliding surface of the slider whereby the head is kept at a fixed distance from the disk surface. The non-flying magnetic head can apply a stronger magnetic field with ease since the head is closer to the disk. The stationary magnetic head has the risk of collision with the disk because the distance between the head and the disk can vary due to axial runouts of the rotating disk due to its warpage and strains. Sometimes a displacement sensor and actuator are provided for keeping the head-disk spacing constant. In contrast, the sliding head is easy to maintain the head-disk distance constant.

Since the non-flying head performs independent of the revolution of the disk, it is adequate for those disks which are operated at a rotational speed as low as compact disks (CD). The non-flying head is relatively free of troubles associated with projections and deposits on the disk surface. If the displacement sensor and actuator can be omitted, it is of simple structure and can be manufactured at a low cost.

However, the non-flying magnetic head for use in a magneto-optical recording system has to apply a magnetic field of higher intensity at a spot remote from the head because the spacing between the head core and the recording medium is increased as compared with flying magnetic heads of rigid disk drives. It is then necessary to conduct electric current as large as about 1 Ap-p across the coil on the head core, with the increased current flowing across the overall modulated magnetic field generating circuit. It is further necessary to reverse such increased current flow at a high frequency. The frequency of current reversal is about 720 kHz at maximum when EFM signals are recorded at a linear speed of 1.4 m/s as used with conventional compact disks (CD) and mini disks (MD). A drive is under development which carries out write/read operation at a linear speed twice higher than the conventional speed for increasing a data transfer rate. With such an advanced drive, the frequency of current reversal can be further increased.

For increasing the current switching speed, JP-A 3-157839 proposes a circuit including two coils and switching elements combined therewith as shown in FIG. 1 wherein the frequency of current reversal is increased by utilizing the constant current effect of inductive reactance.

Japanese U.M. Application Kokai No. 5-15102 intends to improve the circuit of JP-A 3-157839 by adding a damping resistance thereto for the following reason. Since a switching element has an electrostatic capacity, interaction can occur between the capacitance of a switching element and the inductance of a magnetic head coil upon switching of the switching element from on to off. Then a transient current flow having an excessive overshoot is introduced in the driving current flow to adversely affect a reversal time, which is reflected by the recording magnetic field to degrade recording properties. The provision of a damping resistance, however, increases the power consumption of the circuit.

SUMMARY OF THE INVENTION

An object of the present invention is to provide a magneto-optical recording system of the magnetic field modulation mode having an increased switching speed, a minimized overshoot of recording current flow, and a minimized power loss.

The present invention is directed to an apparatus for generating a modulated magnetic field for magneto-optical recording, comprising a magnetic head coil, a first additional inductive (or magnetic field reversing) coil, and a second additional inductive (or magnetic field reversing) coil. One end of the first additional inductive coil is connected to one end of the head coil and to the ground through a first switching element, and the other end of the first additional inductive coil is connected to a DC power supply. One end of the second additional inductive coil is connected to the other end of the head coil and to the ground through a second switching element, and the other end of the second additional inductive coil is connected to the power supply. According to the invention, the inductances of the respective components are optimized to meet $2 \leq (L_R/L_H) \leq 8$ wherein $L_R$ is an average of the inductances of the first and second additional inductive coils and $L_H$ is the inductance of the head coil. Preferably $2 \leq (L_R/L_H) \leq 5$.

Preferably the inductance $L_H$ of the head coil has a value in the range: $2 \leq L_H \leq 50$, more preferably $5 \leq L_H \leq 20$.

A modulated magnetic field generating apparatus as defined above is suitable for use in a magneto-optical recording system comprising a magnetic head and an optical head for recording a signal in a magneto-optical recording medium by directing laser light to the medium from the optical head while applying a modulated magnetic field across the medium from the magnetic head.

BENEFITS OF THE INVENTION

In a modulated magnetic field generating circuit including a magnetic head coil and a pair of additional inductive coils, the relationship between the inductance $L_H$ of the magnetic head coil and the average inductance $L_R$ of the additional inductive coils is optimized according to the invention.

If $L_R/L_H$ is too high, an excessive overshoot develops in the waveform upon recording current reversal as seen from FIG. 3(a), which corresponds to input signals of a rectangular waveform at a frequency 50 kHz. As the frequency increases as in EFM signals used in digital audio systems, an overshoot occupies a larger proportion in a current waveform and as a result, recording current experiences a greater fluctuation. FIG. 3(b) shows the recording current waveform obtained when EFM signals are delivered to a circuit having a $L_R/L_H$ ratio greater than the inventive range. A variation of recording current invites a variation in recording magnetic field intensity, which results in an increased noise component upon recording. As a result, jitter upon reading is undesirably increased. Jitter is substantially increased particularly when signals are recorded at a linear speed at least twice higher than the conventional speed for increasing a data transfer rate. When signals are delivered to a circuit having a $L_R/L_H$ ratio below the inventive range, the rise of inverted current is exacerbated as seen from FIG. 4, also resulting in a variation of recording magnetic field intensity and an increased jitter.

In contrast, the present invention having an optimum $L_R/L_H$ ratio offers a smooth recording current flow having a minimized overshoot as seen from FIGS. 2(a) and 2(b) corresponding to 50 kHz and EFM signal inputs, respectively. Then the jitter of reproduced signals is substantially reduced and remains fully low even when signals are recorded at a linear speed at least twice higher than the conventional speed. The invention avoids any increase of power loss because of the absence of a damping resistance as proposed in Japanese U.M. Application Kokai No. 5-15102.

It is to be noted that Japanese U.M. Application Kokai No. 5-15102 describes a comparative example having no damping resistance, that is, a circuit similar to FIG. 1. The comparative example uses $L_R$=100 μH and $L_H$=2.5 μH, which gives $L_R/L_H$=40 which is far outside the range defined herein. In fact, a substantial overshoot was observed in this comparative example.

Further, JP-A 3-157839 describes the inductance of a head coil which is 1 μH, but not the inductance of additional inductive coils. The importance of the inductances of respective components is not recognized in these prior art references.

BRIEF DESCRIPTION OF THE INVENTION

The above and other objects, features and advantages of the invention will be better understood by reading the following description taken in conjunction with the accompanying drawings.

DESCRIPTION OF THE PREFERRED EMBODIMENT.

The invention is applicable to a magneto-optical recording system of the magnetic field modulation mode. In this mode, a magnetic head is positioned near the front surface (recording layer side) of a magneto-optical recording disk and an optical head is positioned near the rear surface of the disk. For recording, laser light of a suitable intensity is directed from the optical head to the recording layer through the substrate while the magnetic head applies a modulated magnetic field across the laser spot in the recording layer. The magnetic and optical heads are integrally moved in a radial direction of the disk for making access to a selected track.

The modulated magnetic field generating apparatus of the invention is used for generating a modulated magnetic field from the magnetic head. One embodiment of the modulated magnetic field generating apparatus is illustrated in FIG. 1.

The apparatus includes a magnetic head having a head coil 2, a first magnetic field reversing (or additional inductive) coil 11, and a second magnetic field reversing (or additional inductive) coil 12, each coil having one end and another end. The first additional inductive coil 11 has one end connected to the one end of the head coil 2 and to the ground through a first switching element $S_1$ and another end connected to a power supply (+V). The second additional inductive coil 12 has one end connected to the other end of the head coil 2 and to the ground through a second switching element $S_2$ and another end connected to the power supply (+V). The switching elements $S_1$ and $S_2$ may be transistors or the like. The head coil 2 has an internal resistance $R_H$. A control means is coupled to the first and second switching elements $S_1$ and $S_2$ for controlling their on and off states.

Figure 1:
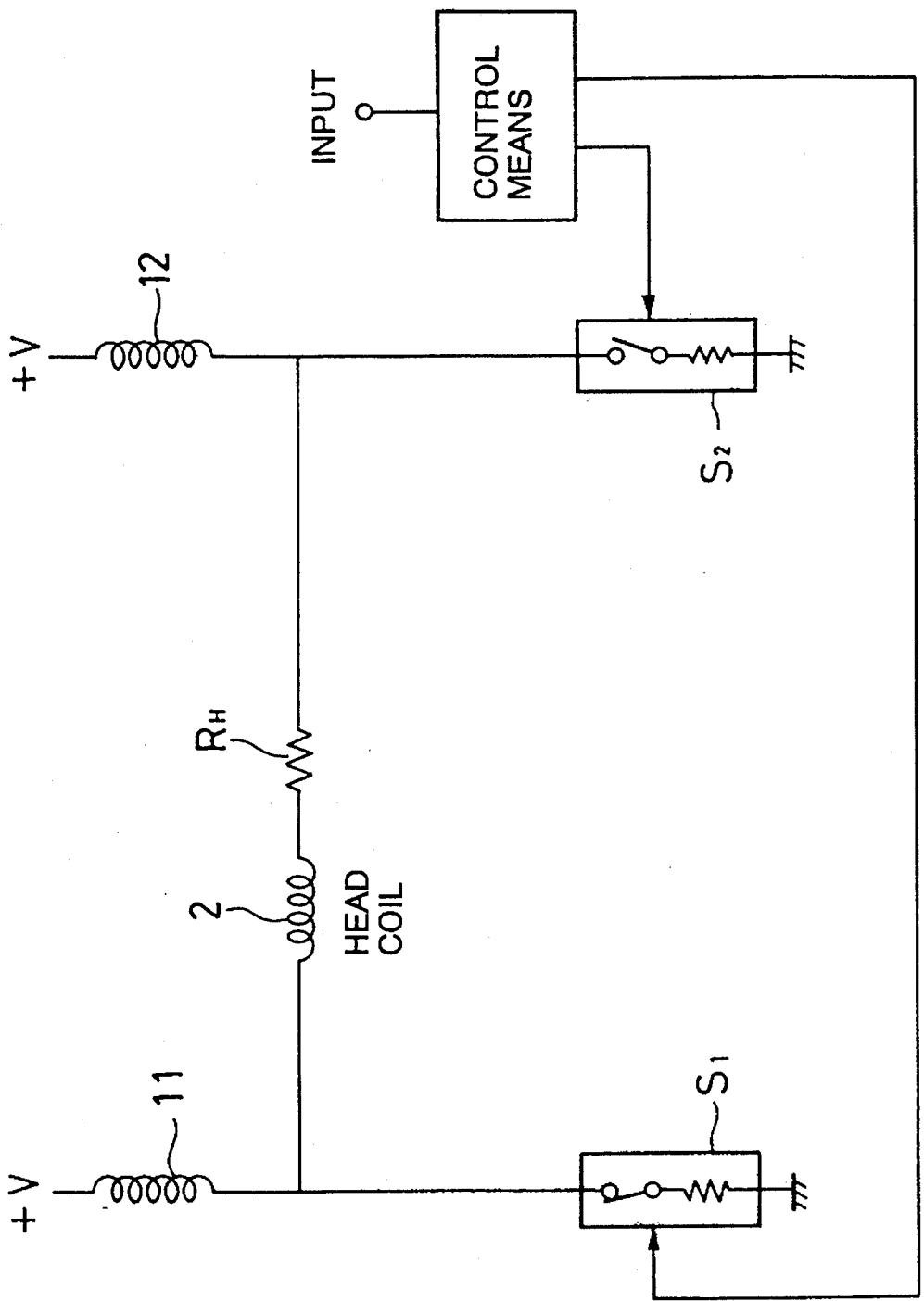
FIG. 1 illustrates one exemplary circuit embodying the modulated magnetic field generating apparatus of the invention.

In FIG. 1, the first switching element $S_1$ is on and the second switching element $S_2$ is off. An electric current resulting from a voltage V applied across the circuit flows along the route: current reversal coil 12→head coil 2→switching element $S_1$ and also along the route: current reversal coil 11→switching element $S_1$. Upon receipt of a signal for magnetic field reversal, the control means controls the switching elements such that the first switching element $S_1$ is turned off and the second switching element $S_2$ is turned on. Then the current flow which has been flowing from the current reversal coil 11 to the ground changes its direction to the head coil 2. Since the current reversal coil 11 tends to maintain the current flow therethrough constant, the reversed current flow through the head coil 2 shows an abrupt rise due to the counter electromotive force, enabling rapid current reversal. If desired, the circuit may further include a constant current source or circuit as disclosed in JP-A 3-57839.

The first and second additional inductive coils 11 and 12 have inductances, an average of which is $L_R$. The head coil 2 has an inductance $L_H$. According to the invention, the inductances are controlled so as to meet the requirement:

$$2 \leq (L_R/L_H) \leq 8,$$

preferably $$2 \leq (L_R/L_H) \leq 5.$$

If the ratio $L_R/L_H$ is greater than 8, an excessive overshoot occurs upon reversal of recording current, resulting in an increased jitter. If $L_R/L_H$ is less than 2, the reversed current flow shows a slow rise, also resulting in an increased jitter.

It will be understood that the two additional inductive coils should preferably have inductances falling in the range of $L_R \pm 5\%$. This is because recording current waveforms become non-symmetric if the inductances of the two additional inductive coils are not equal.

Better results are obtained when the inductance $L_H$ of the head coil 2 is in the range:

$$2 \leq L_H \leq 50,$$

especially $$5 \leq L_H \leq 20.$$

A modulated magnetic field generating apparatus including a head coil having such a relatively high inductance is suitable for a magneto-optical recording system, especially as a non-flying magnetic head therein.

The modulated magnetic field generating apparatus of the invention is applicable to a variety of magneto-optical recording systems using a pair of magnetic and optical heads, especially a magneto-optical recording system using a non-flying magnetic head wherein the magnetic head is positioned at a relatively large distance from the magneto-optical recording medium. Typically the distance between the magnetic head and the magneto-optical recording medium is about 0.04 mm or more, especially about 0.04 mm to about 2 mm.

EXAMPLE

Examples of the invention are given below by way of illustration and not by way of limitation.

A modulated magnetic field generating apparatus having a circuit of the arrangement shown in FIG. 1 was operated to determine recording current waveforms while changing $L_R/L_H$.

Example 1

The additional inductive coils had an average inductance $L_R = 45$ μH and the head coil had an inductance $L_H = 13.6$ μH, which resulted in $L_R/L_H = 3.3$.

Comparative Example 1

The additional inductive coils had an average inductance $L_R = 220$ μH and the head coil had an inductance $L_H = 13.6$ μH, which resulted in $L_R/L_H = 16.2$.

Comparative Example 2

The additional inductive coils had an average inductance $L_R = 17$ μH and the head coil had an inductance $L_H = 13.6$ μH, which resulted in $L_R/L_H = 1.25$.

Figure 2A:
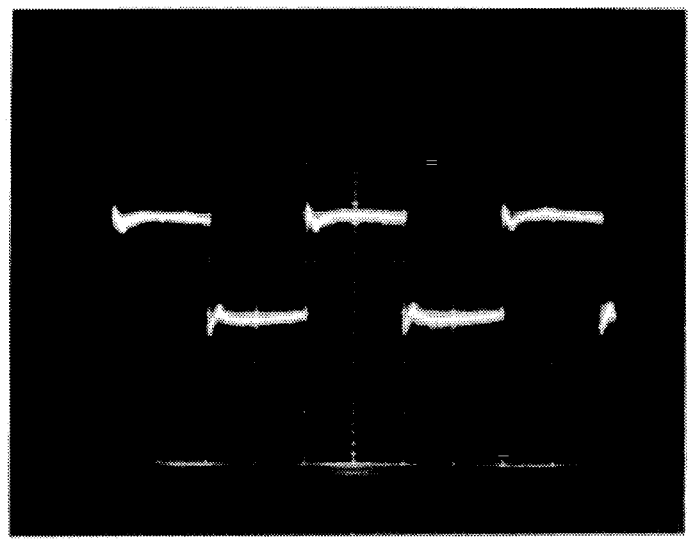
FIG. 2(a) shows the recording current waveforms produced by the apparatus of Example 1 which received a rectangular wave at 50 kHz.
Figure 2B:
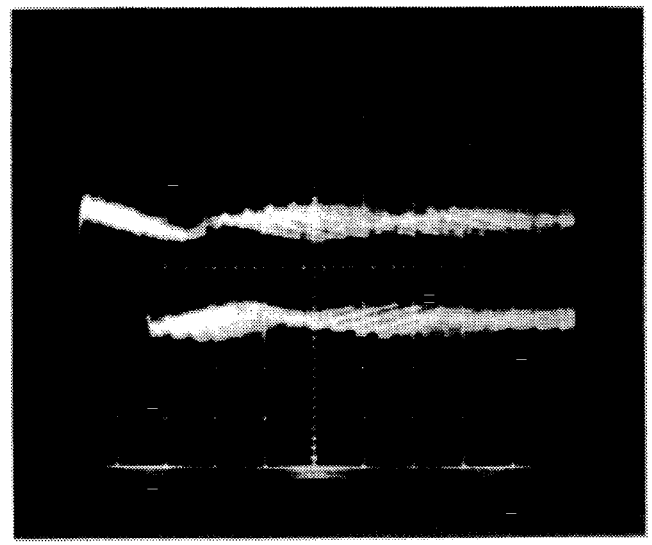
FIG. 2(b) shows the recording current waveforms produced by the apparatus of Example 1 which received an EFM signal.

FIG. 2(a) shows the recording current waveforms produced by the apparatus of Example 1 which received an input signal in the form of a rectangular wave at 50 kHz. FIG. 2(b) shows the recording current waveforms produced by the apparatus of Example 1 which received an EFM code as an input signal. Note that waveforms were measured by means of an oscilloscope.

Figure 3A:
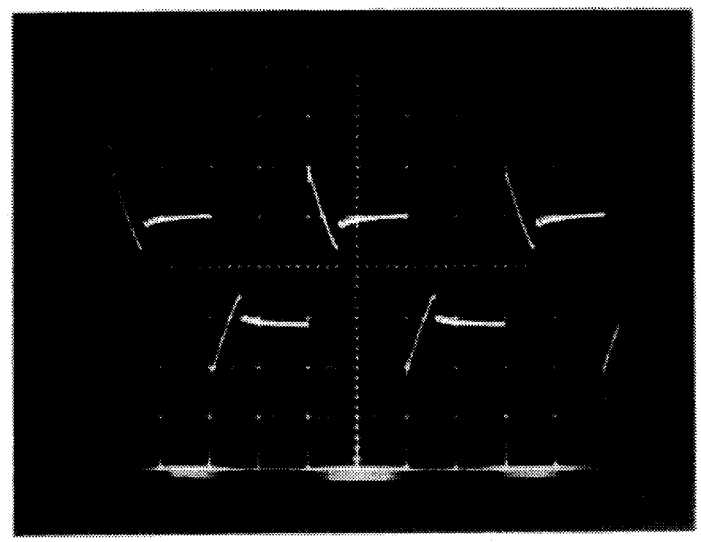
FIG. 3(a) shows the recording current waveforms produced by the apparatus of Comparative Example 1 which received a rectangular wave at 50 kHz.
Figure 3B:
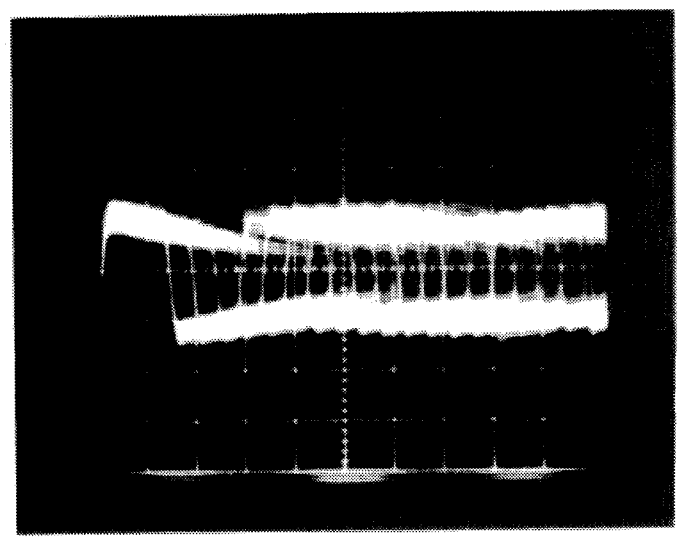
FIG. 3(b) shows the recording current waveforms produced by the apparatus of Comparative Example 1 which received an EFM signal.

FIG. 3(a) shows the recording current waveforms produced by the apparatus of Comparative Example 1 which received an input signal in the form of a rectangular wave at 50 kHz. FIG. 3(b) shows the recording current waveforms produced by the apparatus of Comparative Example 1 which received an EFM code as an input signal.

Figure 4:
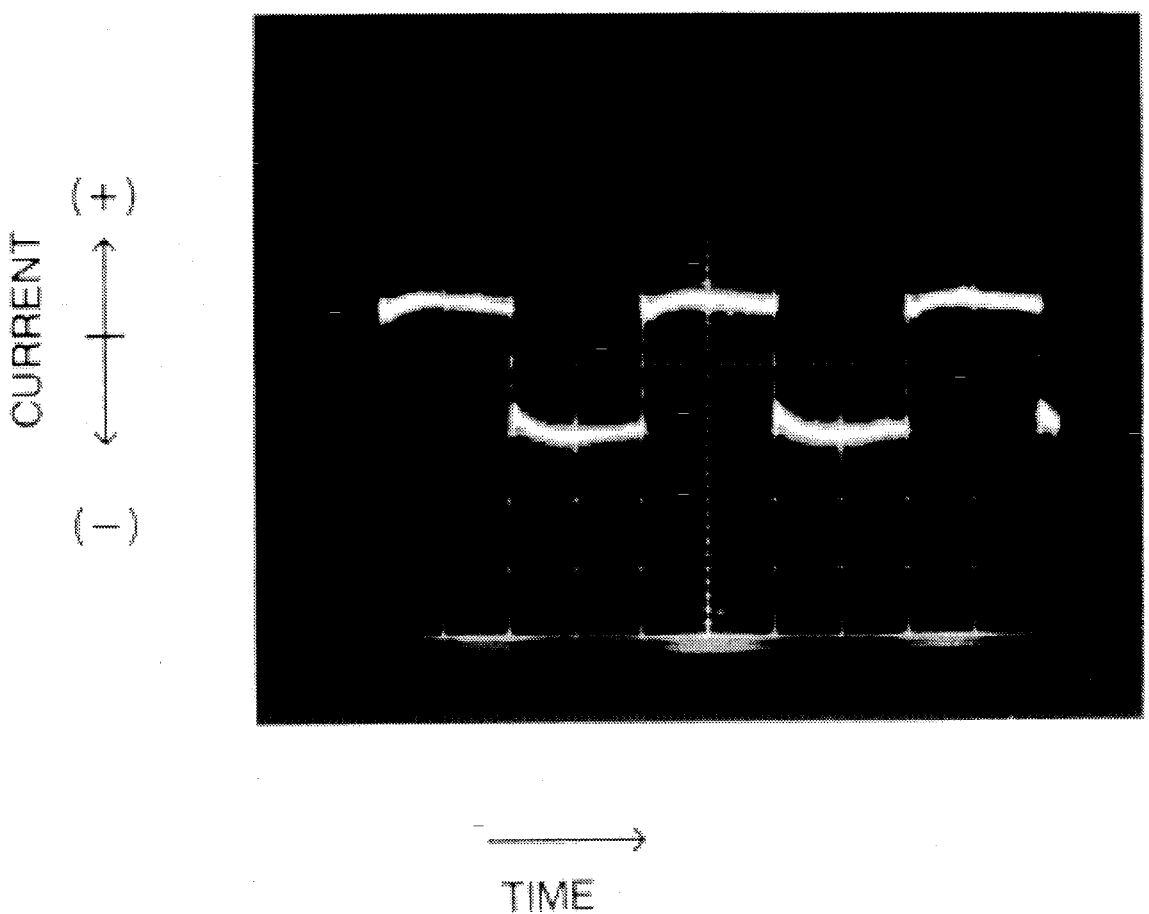
FIG. 4 shows the recording current waveforms produced by the apparatus of Comparative Example 2 which received a rectangular wave at 50 kHz.

FIG. 4 shows the recording current waveforms produced by the apparatus of Comparative Example 2 which received an input signal in the form of a rectangular wave at 50 kHz.

As seen from FIGS. 2 to 4, the present invention is effective for minimizing the overshoot upon reversing of the recording current, providing an acceptable rise of reversed current flow, and suppressing the variation of recording current by EFM signals.

Figure 5:
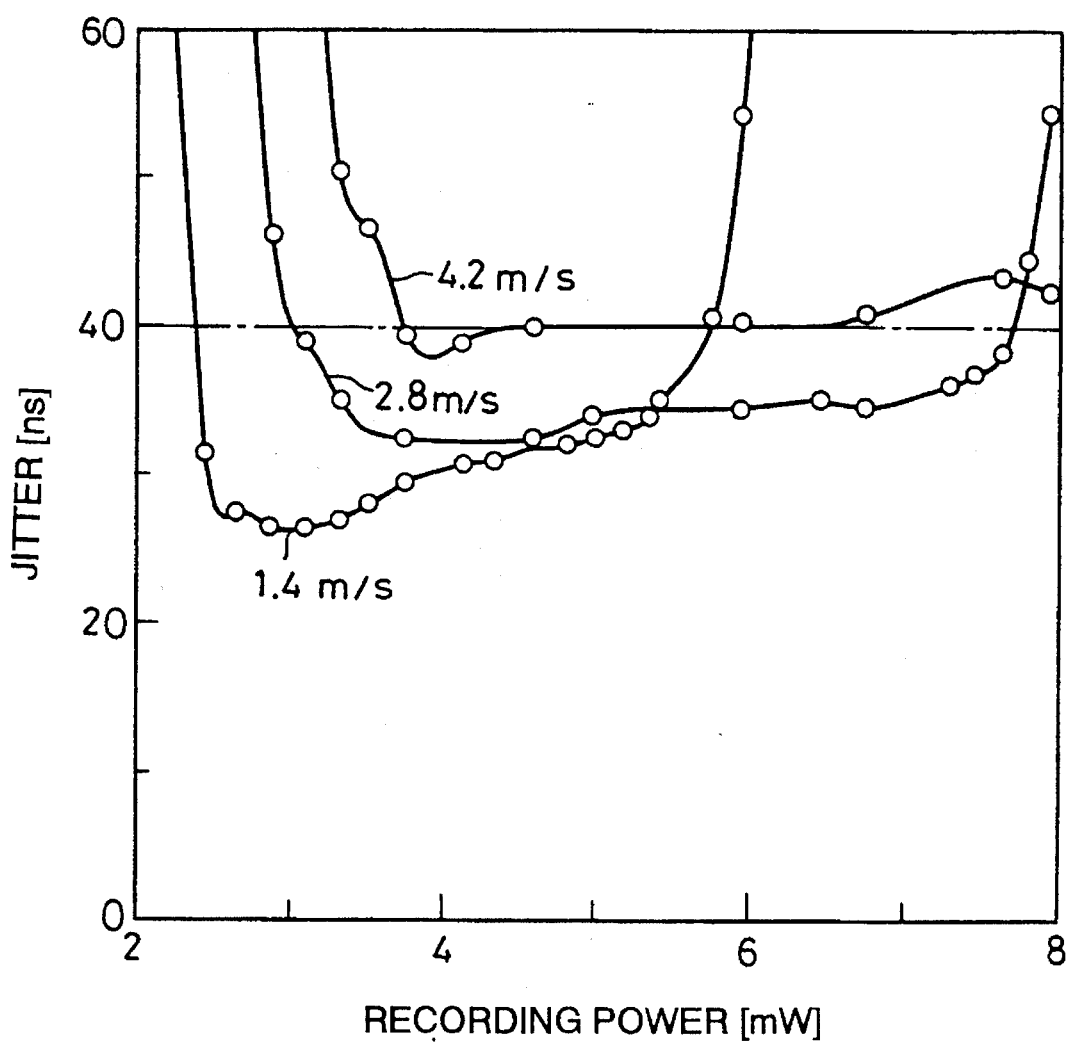
FIG. 5 is a graph showing the timing jitter relative to recording power of a magneto-optical recording system according to the invention.

A magneto-optical recording system having the circuit of Example 1 was operated for measuring the dependency of jitter on recording power. The relative linear speed during writing was 1.4 m/s, 2.8 m/s (double speed), and 4.2 m/s (triple speed) while the relative linear speed during reading was fixed at 1.4 m/s. The results are plotted in FIG. 5. The recording power range within which jitter is less than 40 ns, which is also referred to as a recording power margin, was wide enough at the double speed or lower. The jitter could be suppressed almost less than 40 ns even at the triple speed. In contrast, when a similar measurement was performed with the circuits of Comparative Examples 1 and 2, the jitter exceeded 40 ns even at a linear speed of 1.4 m/s.

The effectiveness of the invention is evident from the results of these examples.

Japanese Patent Application No. 5-289870 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An apparatus for generating a modulated magnetic field for magneto-optical recording, comprising:

a magnetic head coil, a first additional inductive coil, and a second additional inductive coil, each coil having one end and another end, one end of said first additional inductive coil being connected to one end of the head coil and to the ground through a first switching element, the other end of said first additional inductive coil being connected to a power supply, one end of said second additional inductive coil being connected to the other end of the head coil and to ground through a second switching element, the other end of said additional inductive coil being connected to the power supply, control means for repetitively switching the first and second switching elements between respective ON/OFF states, and said first and second additional inductive coils having inductances, an average of which is $L_R$, and said head coil having an inductance $L_H$, wherein $2 \leq (L_R/L_H) \leq 8$.

2. The apparatus of claim 1 wherein $2 \leq (L_R/L_H) \leq 5$.
3. The apparatus of claim 1 wherein $2 \leq L_H \leq 50$.
4. The apparatus of claim 3 wherein $5 \leq L_H \leq 20$.
5. A method for magneto-optical recording in a magneto-optical recording medium, comprising the steps of:

rotating the medium relative to a magnetic head, directing laser light to the medium from an optical head, generating a modulated magnetic field by the steps of:

supplying power through respective first and second inductive coils, through a head coil and to ground through respective first and second switches, and alternately controlling the respective ON/OFF states of said first and second switching elements, the first and second inductive coils having inductances, an average of which is $L_R$, and said head coil having an inductance wherein $2 \leq (L_R/L_H) \leq 8$, applying said modulated magnetic field across the magneto-optical medium from the magnetic head.

6. A magneto-optical recording apparatus according to claim 1, further comprising:

a magneto-optical recording medium;

a magnetic head and an optical head for recording a signal in said magneto-optical recording medium;

means for directing laser light to the magneto-optical recording medium from the optical head; and means for applying a modulated magnetic field across the magneto-optical medium from the magnetic head.

7. The apparatus of claim 6, wherein $2 \leq L/L) \leq 5$.

8. The apparatus of claim 6, wherein $2 \leq L \leq 50$.

9. The apparatus of claim 8, wherein $5 \leq L \leq 20$.

* * * * *

UNITED STATES PATENT AND TRADEMARK OFFICE
CERTIFICATE OF CORRECTION

PATENT NO. : 5,477,509
DATED : December 19, 1995
INVENTOR(S) : Giichi SHIBUYA; Masanori SHIBAHARA; Takashi ONODERA It is certified that error appears in the above-identified patent and that said Letters Patent is hereby corrected as shown below:

Claim 5, column 7, line 3, after "inductance" insert --$L_H$--

Signed and Sealed this

Second Day of April, 1996

Attest:

*Attesting Officer*

BRUCE LEHMAN
*Commissioner of Patents and Trademarks*